(12) United States Patent  
Duston et al.

(10) Patent No.: US 8,854,519 B2  
(45) Date of Patent: Oct. 7, 2014

(54) ELECTRO-ACTIVE FOCUS AND ZOOM SYSTEMS

(75) Inventors: Dwight Duston, Laguna Niguel, CA (US); Anthony Van Heugten, Sarasota, FL (US)

(73) Assignee: e-Vision Smart Optics, Inc., Sarasota, FL (US)

( * ) Notice: Subject to any disclaimer, the term of this patent is extended or adjusted under 35 U.S.C. 154(b) by 565 days.

(21) Appl. No.: 13/143,659

(22) PCT Filed: Jan. 13, 2010

(86) PCT No.: PCT/US2010/020893  
§ 371 (c)(1),  
(2), (4) Date: Aug. 10, 2011

(87) PCT Pub. No.: WO2010/083211  
PCT Pub. Date: Jul. 22, 2010

(65) Prior Publication Data  
US 2011/0292266 A1 Dec. 1, 2011

Related U.S. Application Data

(60) Provisional application No. 61/144,796, filed on Jan. 15, 2009, provisional application No. 61/225,065, filed on Jul. 13, 2009.

(51) Int. Cl.  
*H04N 3/14* (2006.01)  
*G02B 3/14* (2006.01)  
*G02B 13/00* (2006.01)  
*G02F 1/29* (2006.01)

(52) U.S. Cl.  
CPC ............ *G02B 3/14* (2013.01); *G02F 2001/294* (2013.01); *G02B 13/008* (2013.01); *G02B 13/0075* (2013.01); *G02B 13/006* (2013.01); *G02B 13/009* (2013.01); *G02B 13/005* (2013.01)  
USPC ......................................................... 348/308

(58) Field of Classification Search  
USPC ......................................................... 348/308  
See application file for complete search history.

(56) References Cited

U.S. PATENT DOCUMENTS

| | | | |
|---|---|---|---|
| 5,712,721 A | 1/1998 | Large | |
| 6,898,021 B1 * | 5/2005 | Tang | 359/666 |
| 2003/0058406 A1 * | 3/2003 | Blum et al. | 351/216 |
| 2004/0108984 A1 | 6/2004 | Ogasawara | |
| 2005/0270481 A1 | 12/2005 | Blum | |

(Continued)

FOREIGN PATENT DOCUMENTS

| | | |
|---|---|---|
| CN | 1912672 | 2/2007 |
| JP | H11160170 | 6/1999 |

(Continued)

*Primary Examiner* — Usman Khan  
(74) *Attorney, Agent, or Firm* — Michael Haynes PLC; Michael N. Haynes (57) ABSTRACT

Aspects of the present invention provide dynamic focusing systems and dynamic zoom systems having no moving parts. The dynamic focusing systems can include an electro-active lens, a fixed focus lens in optical communication with the electro-active lens and a focal plane. The dynamic zoom systems can include a first electro-active lens, a second electro-active lens, a fixed focus lens, and a focal plane. The electro-active lenses of the present invention can have an adjustable optical power to provide variable focusing capability. The dynamic focusing systems and dynamic zoom systems can include a controller for altering the adjustable optical powers of the electro-active lenses. The dynamic focusing systems can focus on objects at various distances based on the controlled optical power of the included electro-active lenses. The dynamic zoom systems can provide magnification and de-magnification based on the controlled optical power of the included electro-active lenses.

20 Claims, 6 Drawing Sheets

(56) References Cited

U.S. PATENT DOCUMENTS

| | | | |
|---|---|---|---|
| 2006/0095128 A1 | 5/2006 | Blum | |
| 2006/0164593 A1 | 7/2006 | Peyghambarian | |
| 2007/0183293 A1 | 8/2007 | Murata | |
| 2007/0242173 A1* | 10/2007 | Blum et al. | 349/13 |
| 2007/0280626 A1* | 12/2007 | Haddock et al. | 385/147 |
| 2008/0208335 A1 | 8/2008 | Blum | |
| 2008/0246922 A1* | 10/2008 | Blum et al. | 351/233 |

FOREIGN PATENT DOCUMENTS

| | | |
|---|---|---|
| JP | 2000077736 | 3/2000 |
| JP | 2004334028 | 11/2004 |
| JP | 2006018325 | 1/2006 |
| JP | 2006048818 | 2/2006 |
| JP | 2006145957 | 6/2006 |
| JP | 2006243573 | 9/2006 |
| JP | 2007322625 | 12/2007 |
| JP | 3140079(U) | 3/2008 |
| JP | 2008089834 | 4/2008 |
| KE | 20060113732 | 11/2006 |
| WO | WO2008024071 | 2/2008 |
| WO | WO2008138010 | 11/2008 |

* cited by examiner

ELECTRO-ACTIVE FOCUS AND ZOOM SYSTEMS

CROSS-REFERENCE TO RELATED APPLICATIONS

This application claims priority from and incorporates by reference in their entirety the following provisional applications:
U.S. Appl. No. 61/144,796, filed on Jan. 15, 2009; and
U.S. Appl. No. 61/225,065, filed on Jul. 13, 2009.

BACKGROUND OF THE INVENTION

1. Field of the Invention

The present invention generally relates to electro-active optical systems. More specifically, the present invention provides improved electro-active optical systems having dynamic focus and zoom capabilities.

2. Background Art

Conventional optical focus systems and optical zoom systems require moving parts. As a consequence, devices incorporating these conventional systems can be bulky, heavy and prone to failure due to particulate contamination. Further, conventional optical focus systems and zoom systems can also be prone to failure from shock and vibration.

Accordingly, what are needed are improved optical focus systems and improved optical zoom systems that do not require moving parts. By obviating the need for moving parts, devices incorporating the improved optical focus and zoom systems can be made thinner and lighter. They can also be made to be more tolerant of shock and vibration and can be less prone to failure due to particulate contamination.

DETAILED DESCRIPTION OF THE INVENTION

Aspects of the present invention provide dynamic focusing systems having no moving parts. For example, all lenses and focal planes, or a portion thereof, can be immobile along an optical axis in the dynamic focusing systems of the present invention. The dynamic focusing systems of the present invention can include an electro-active lens, a fixed focus lens in optical communication with the electro-active lens and a focal plane. The focal plane can be positioned to receive light focused by the combination of the electro-active lens and the fixed focus lens. The electro-active lenses of the present invention can have an adjustable optical power to provide variable focusing capability. The dynamic focusing systems of the present invention can include a controller for altering the adjustable optical power of the electro-active lens. The dynamic focusing systems of the present invention can focus on objects at various distances based on the controlled variable optical power of the electro-active lens. Light focused by the dynamic focusing systems of the present invention may be in the form of visible light or another type of electromagnetic radiation, such as, for example, ultraviolet or infrared light.

Aspects of the present invention provide dynamic zoom systems having no moving parts. For example, all lenses and focal planes, or a portion thereof, can be immobile along an optical axis in the dynamic zoom systems of the present invention. The dynamic zoom systems of the present invention can include a first electro-active lens, a second electro-active lens, a fixed focus lens, and a focal plane. The first electro-active lens, the second electro-active lens and the fixed focus length lens can be in optical communication. The focal plane can be positioned to receive light focused by the combination of the first electro-active lens, the second electro-active lens and the fixed focus lens. The dynamic zoom systems of the present invention can include a controller for altering the adjustable optical powers of the electro-active lenses. The dynamic zoom systems of the present invention can provide magnification and de-magnification based on the controlled variable optical powers of the electro-active lenses. The dynamic zoom systems and dynamic focusing systems of the present invention can be used in combination with one another and/or in combination with any number of additional electro-active or fixed focus lenses.

Figure 1:
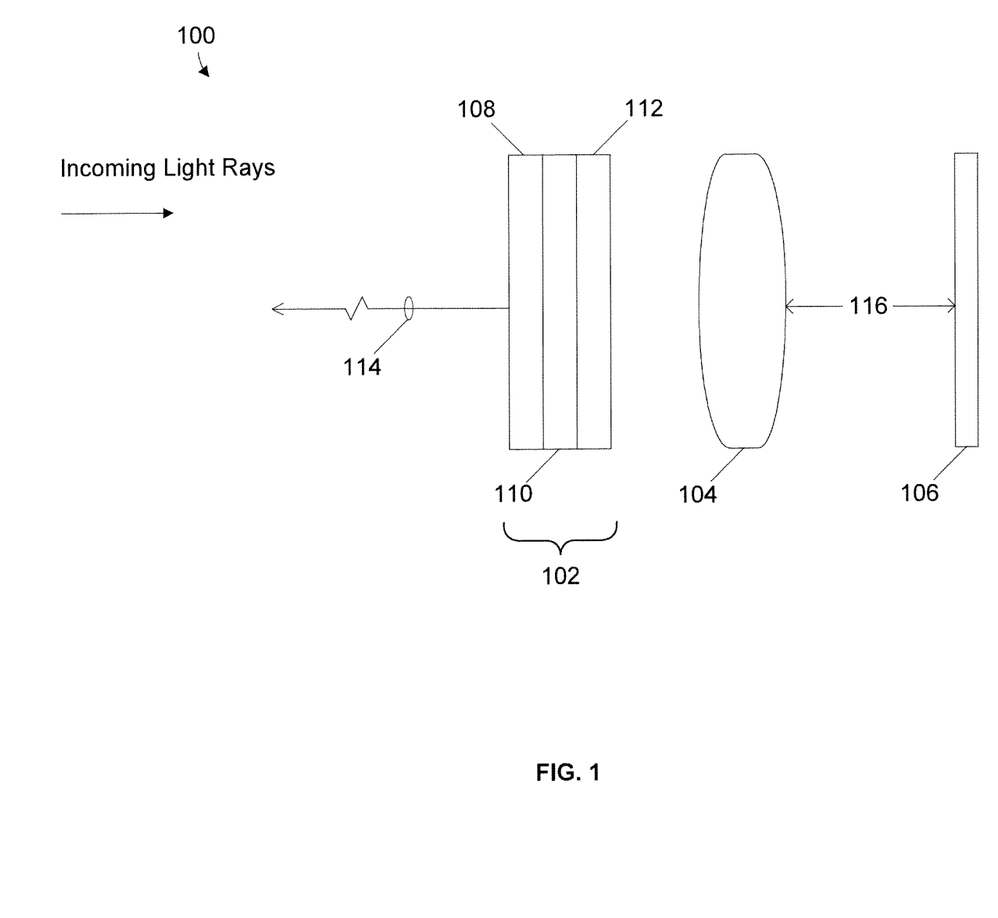
FIG. 1 illustrates a first dynamic focusing system in accordance with an aspect of the present invention.

FIG. 1 illustrates a dynamic focusing system 100 in accordance with an aspect of the present invention. The dynamic focusing system 100 can provide the ability to focus on objects positioned at various distances without the use of any moving parts or components (i.e., the constituent components can be immobile with respect to each other along an optical axis). The dynamic focusing system 100 can comprise an electro-active lens 102 and a fixed focus lens 104 positioned to be in optical communication with one another. The fixed focus lens 104 is depicted as a biconvex lens for illustrative purpose only and is not so limited. That is, the fixed focus lens 104 can be any type of lens having a fixed or static optical power.

The dynamic focusing system 100 is shown in FIG. 1 as comprising only one electro-active lens 102 and only one fixed focus lens 104 but is not so limited. That is, the dynamic focusing system 100 of the present invention can include any number of electro-active lenses and any number of fixed focus lenses. Further, the any number of electro-active lenses and the any number of fixed focus lenses of the dynamic focusing system 100 of the present invention can be arranged in any manner and is not limited to the particular arrangement of the electro-active lens 102 and the fixed focus lens 104 depicted in FIG. 1. More specifically, the any number of electro-active lenses and the any number of fixed focus lenses can be positioned in any order and with any spacing (including no spacing) between the electro-active lenses and the fixed focus lenses. As an example, the fixed focus lens 104 can be positioned in front of the electro-active lens 102 in contrast to the arrangement depicted in FIG. 1.

The dynamic focusing system 100 can also comprise a focal plane 106. The focal plane 106 can be a charge coupled device (CCD), a complementary metal oxide semiconductor (CMOS) device, camera (e.g., film camera) or other device capable of receiving and/or processing an image focused by the combination of the electro-active lens 102 and the fixed focus lens 104. The electro-active lens 102 can be any electro-active lens capable of adjusting, alternating or tuning an optical power provided by the lens through the application of electricity. In general, the electro-active lens 102 can comprise a first substrate 108, an electro-active layer 110 comprising liquid crystal, and a second substrate 112.

The electro-active lens 102, the fixed focus lens 104, and the focal plane 106 can be in fixed spatial positions. That is, the dynamic focusing system 100 can provide focusing capability (e.g., auto-focus functionality) without any moveable component or part.

The dynamic focusing system 100 can provide any number of focusing points. In particular, the dynamic focusing system 100 can focus light from objects positioned at any distance 114 away from the dynamic focusing system 100 onto the focal plane 106. The focal plane 106 can be positioned at any distance 116 from the focusing elements (e.g., the electro-active lens 102 and the fixed focus lens 104 as shown in FIG. 1) of the dynamic focusing system 100. In general, the distance 116 between the focal plane 106 and the focusing elements of the dynamic focusing system 100 can be determined by the application in which the dynamic focusing system 100 is employed, as will readily be understood by one of skill in the art. For example, when used in a mobile phone, the distance 116 may be smaller than what may be used in a hand-held digital camera application.

In general, the fixed focus lens 104 can provide any fixed optical power—for example ranging from 20 to 350 Diopters. The fixed optical power provided by the fixed focus lens 104 can depend on a number of factors including the distance 116 and the variable optical power provided by the electro-active lens 102. Depending upon the type and construction of the electro-active lens 102, the electro-active lens can provide multiple discrete and/or continuously-varying optical powers within a range of possible optical powers. The range of possible optical powers can include positive, negative and/or neutral optical powers in a manner to provide variable focusing capability.

As an illustrative non-limiting example, the fixed focus lens 104 can provide a fixed optical power of 51 Diopters and the electro-active lens can provide a range of optical powers from −1.0 Diopters to 1.0 Diopters in quantized increments of 0.5 Diopters. Accordingly, the electro-active lens 102 can be controlled to provide optical powers of −1.0, −0.5, 0.0, 0.5, and 1.0 Diopters such that the focusing elements of the dynamic focusing system 100 can provide combined optical powers of 50.0, 50.5, 51.0, 51.5, and 52 Diopters. Based on the image distance—i.e., the distance 116 between the focusing elements and the focal plane 106—the dynamic focusing system 100 can focus objects at several different distances. For an exemplary image distance 116 of 2 cm, the dynamic focusing system can provide discrete focus points at approximately infinity, 2 m, 1 m, ⅔ m, and ½ m. Aperture size of the dynamic focusing system 100 can also affect the range of focus points (e.g., depth-of-field) such that the tunable range can be essentially continuous.

Figure 2:
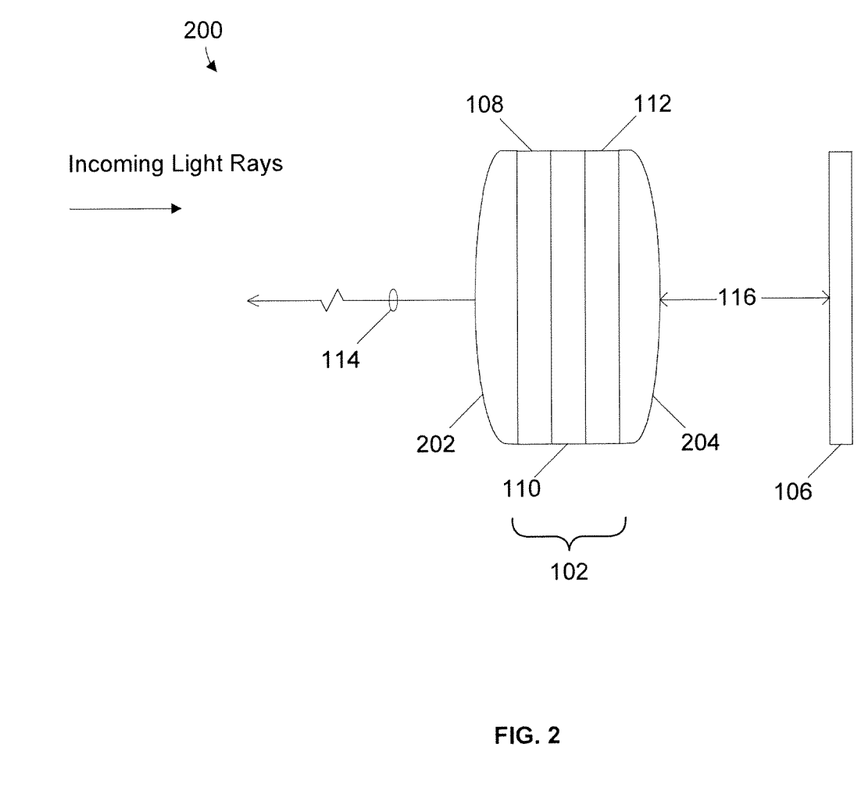
FIG. 2 illustrates a second dynamic focusing system in accordance with an aspect of the present invention.

FIG. 2 illustrates a dynamic focusing system 200 in accordance with an aspect of the present invention. As with the dynamic focusing system 100, the dynamic focusing system 200 can provide the ability to focus objects at various distances without the use of any moving parts or components (i.e., the constituent components can be immobile with respect to each other along an optical axis). The dynamic focusing system 100 can comprise an electro-active lens 102, a first fixed focus lens 202, and a second fixed focus lens 204 positioned to all be in optical communication.

The dynamic focusing system 200 operates in a manner similar to the dynamic focusing system 100 described above with the exception that the focusing elements of the dynamic focusing system 200—the electro-active lens 102 and the first and second fixed focus lenses 202 and 204—are combined to form a combined composite lens or lens element (whereas the focusing elements of the dynamic focusing system 100 can be viewed as separate, distinct elements physically spaced apart from one another). In general, the dynamic focusing system of the present invention can use any combination of composite or separate focusing elements using any number of fixed focus lenses and electro-active lenses. Further, the dynamic focusing system of the present invention can either place an electro-active lens closer to an object being viewed (and a fixed focus lens further from an object being viewed—e.g., as shown in FIG. 1) or can place a fixed focus lens closer to the object being viewed (and an electro-active lens further from the object being viewed). Conversely, the dynamic focusing system of the present invention can either place an electro-active lens closer to a focal plane (and a fixed focus lens further from a focal plane—e.g., as shown in FIG. 1) or can place a fixed focus lens closer to the focal plane (and an electro-active lens further from the focal plane).

As described above, the electro-active lens 102 can be any electro-active lens 102 capable of adjusting or altering the optical power it provides. Exemplary electro-active lenses that can be used as the electro-active lens 102 can include: an etched-pattern electro-active lens, an electro-active lens with lithographically-patterned electrodes, and an electro-active lens that uses lithographically-patterned resistive bridges.

An etched-pattern electro-active lens can be fabricated by etching a pattern (e.g., a refractive or diffractive pattern) into a substrate material (e.g., an ophthalmic plastic material). This etched pattern can then be coated with a transparent conductor (e.g., indium tin oxide—ITO) and an alignment layer to create a preferred alignment direction for the liquid crystal. Another similar un-etched substrate can also be coated with ITO and an alignment layer. The two substrates can then be brought together in close proximity. Liquid crystal can then be sealed within the void between the substrates.

The substrate materials and the liquid crystal material can be chosen so that they each have the same index of refraction when the electro-active lens is in an off state. When the electro-active lens is placed into an on state, the index of the birefringent liquid crystal can change such that the liquid crystal has an index of refraction different from the index of refraction of the two substrates. As a result, the etched pattern can become functional and can alter the optical power of the electro-active lens.

U.S. Pat. Nos. 5,712,721, 6,517,203 and U.S. patent application Ser. No. 12/408,973, filed Mar. 23, 2009, each describe examples of etched-pattern electro-active lenses that can be used to form the electro-active lens 102 and are each hereby incorporated by reference in their entirety.

A lithographically-patterned electro-active lens can use an ITO-coated substrate that is subsequently patterned lithographically to form concentric ring electrodes that are electrically insulated from each other. The patterned substrate can then be mated with another substrate with a reference electrode similar to the reference substrate for an etched-patterned electro-active lens. Liquid crystal can be then be sealed between the two substrates. An array of different voltages can then be applied to each of the rings to create a gradient in the index of refraction of the liquid crystal, thereby creating a lens providing dynamic optical power. This design approach also permits the electro-active lens to provide either positive or negative optical powers as a function of the voltage gradient placed across the electrodes.

U.S. Pat. Nos. 6,517,203, 7,264,354 and U.S. patent application Ser. No. 12/135,587, filed Jun. 9, 2008, each describe examples of lithographically-patterned electro-active lenses that can be used to form the electro-active lens 102 and are each hereby incorporated by reference in their entirety.

A lithographically-patterned electro-active lens that uses resistive bridges can use lithographically-patterned ring electrodes that are not insulated from one another. Instead, each patterned electrode can be connected to adjacent patterned electrodes using resistive bridges. The use of resistive bridges can enable a small voltage potential difference to be established between adjacent electrodes. This structure allows many electrodes to be grouped together and addressed or controlled with a single voltage. As a result, the need for large numbers of bus lines or control lines when hundreds of electrodes are used is eliminated. Additionally, this design can provide a more "tunable" electro-active lens as will be appreciated by one skilled in the pertinent art. That is, a large number of optical phase profiles, or spherical lens powers, can be achieved merely by tuning the voltage profile across the lens, enabling essentially analog or analog-like optical power control.

U.S. patent application Ser. No. 12/410,889, filed Mar. 25, 2009 and U.S. Prov. Pat. Appl. No. 61/269,110, filed Jun. 19, 2009 each describe examples of lithographically-patterned electro-active lenses that use resistive bridges that can be used to form the electro-active lens 102 and are each hereby incorporated by reference in their entirety.

Figure 3:
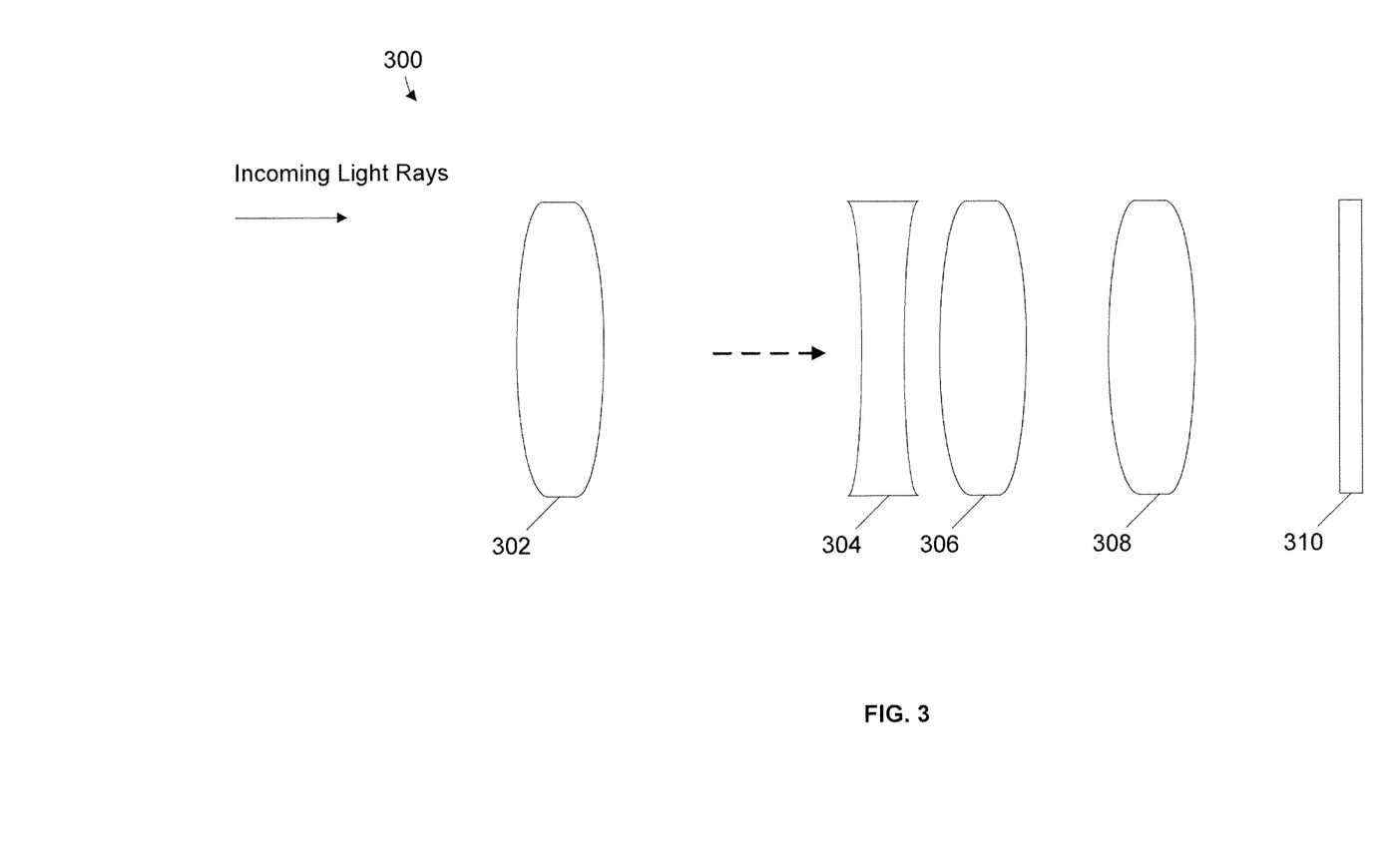
FIG. 3 illustrates a conventional zoom lens system.

FIG. 3 illustrates a conventional zoom lens system 300. The conventional zoom lens system 300 requires moving parts—in particular, one or more moveable lenses—to provide zoom operation. The conventional zoom lens system 300 comprises a first lens 302, a second lens 304, a third lens 306, a fourth lens 308 and a focal plane 310. The first lens 302 is a converging lens. The second lens 304 is a diverging lens. The third lens 306 is a converging lens. The fourth lens 308 is a converging lens and can function as a focusing element.

Any or all of the components of the conventional zoom system 300 can be moveable and at least one component is required to be moved to provide desired zoom functionality. The conventional zoom system 300, as depicted in FIG. 3, at least requires the second lens 304 to be moveable. The conventional zoom system 300 is shown in FIG. 3 in a wide-angle setting. Specifically, the second lens 304 has been moved away from the object being viewed (i.e., away from the first lens 302). Moving the second lens 304 away from the first lens 302 reduces a magnification of an object being viewed as substantially all light rays incident on the first lens 302 are focused on the focal plane 310.

Figure 4:
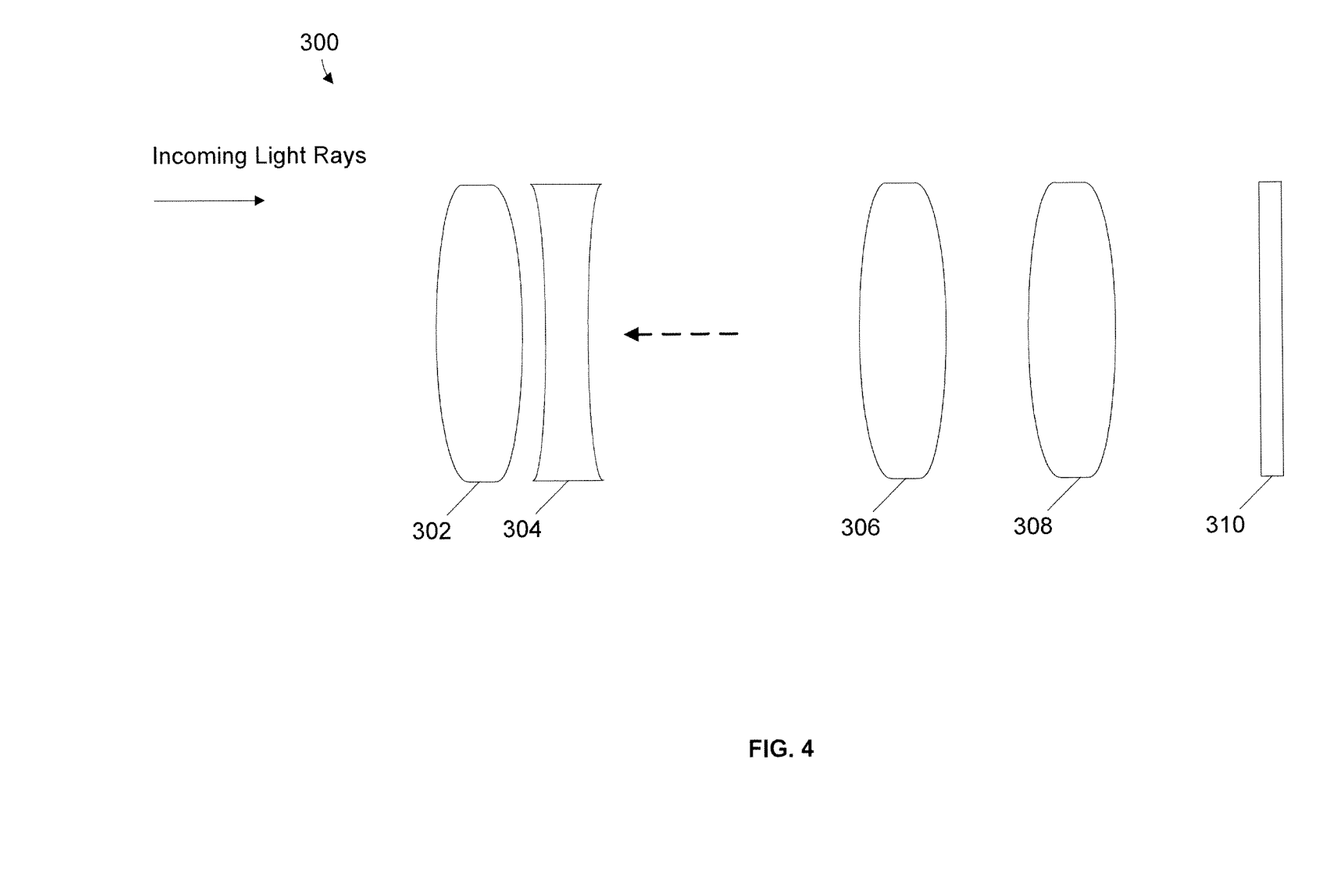
FIG. 4 illustrates the conventional zoom lens system of FIG. 3 in a zoom or telephoto setting.

FIG. 4 illustrates the conventional zoom lens system 300 in a zoom or telephoto setting. Specifically, the second lens 304 has been moved closer to the object being viewed (i.e., closer to the first lens 302). Moving the second lens 304 closer to the first lens 302 increases a magnification of the object being viewed as only a portion of all light rays incident on the first lens 302 are focused on the focal plane 310.

Figure 5:
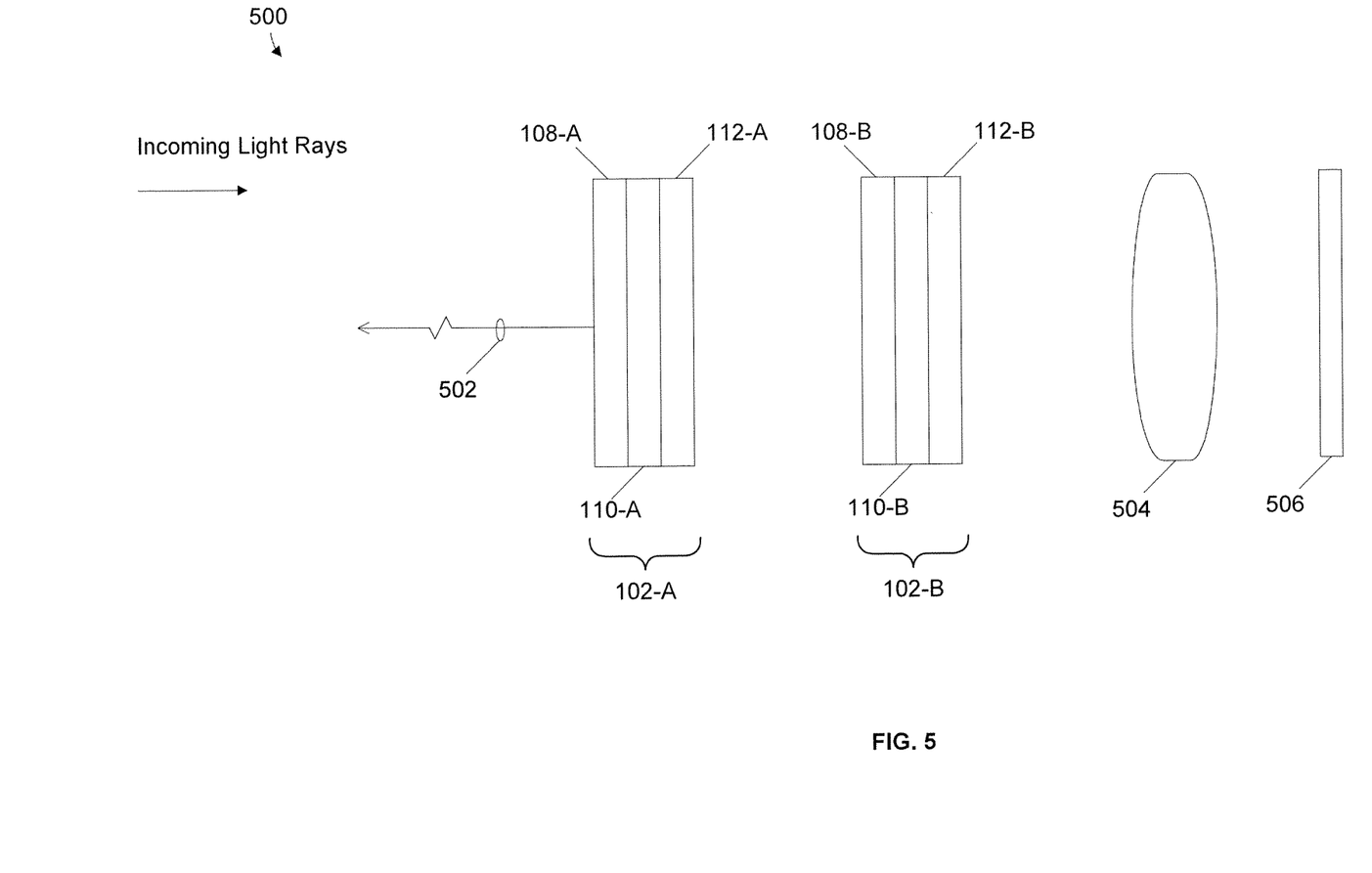
FIG. 5 illustrates a zoom system in accordance with an aspect of the present invention.

FIG. 5 illustrates a zoom system 500 in accordance with an aspect of the present invention. The zoom system 500 can comprise a first electro-active lens 102-A, a second electro-active lens 102-B, a focusing element 504, and a focal plane 506. The focusing element 504 is illustrated as a biconvex lens but is not so limited. That is, the focusing element 504 can be, for example, any fixed focus lens. The focal plane 506 can be a charge coupled device (CCD) or camera or other device capable of receiving and/or processing light outputted by the focusing element 504. The zoom system 500 can include one or more additional fixed focus lenses and is not limited to the arrangement and spacing of components as depicted in FIG. 5. For example, the first electro-active lens 102-A and/or the second electro-active lens 102-B can be combined with one or more fixed focus lenses (e.g., placed in optical communication therewith) to increase the optical power that can be provided from what can be provided by these electro-active lenses when operating alone.

The first and second electro-active lenses 102-A and 102-B can be any of the electro-active lenses described above. The first and second electro-active lenses 102-A and 102-B and the focusing element 504 and the focal plane 506 can be spaced any desired or required fixed distance apart. The zoom system 500 can provide the same zoom functionality as the conventional zoom system 300 without the need for any moving parts or components. That is, the zoom system 500 can provide zoom and wide angle functionality when viewing an object at a distance 502 with each of its constituent components (e.g., the first and second electro-active lenses 102-A and 102-B, the focusing element 504 and the focal plane 506) being fixed and immobile.

To provide a zoom or telephoto setting, the first electro-active lens 102-A can be controlled to provide negative (e.g., minus or diverging) optical power and the second electro-active lens 102-B can be controlled to provide positive (e.g., plus or converging) optical power. As will be appreciated by one skilled in the pertinent art, this particular combination of negative and positive optical power lenses can increase a magnification of the object being viewed as only a portion of all light rays incident on the first electro-active lens 102-A can be focused on the focal plane 506.

To provide a wide-angle setting, the first electro-active lens 102-A can be controlled to provide positive (e.g., plus or converging) optical power and the second electro-active lens 102-B can be controlled to provide negative (e.g., minus or diverging) optical power. As will be appreciated by one skilled in the pertinent art, this particular combination of positive and negative optical power lenses can reduce a magnification of an object being viewed (or de-magnify) as substantially all light rays incident on the first electro-active lens 102-A can be focused on the focal plane 506.

When both the electro-active lens 102-A and 102-B are in an "off" state (e.g., when each of the electro-active lenses 102-A and 102-B provide zero or neutral optical power), a non-magnified image of an object being viewed can be created on the focal plane 506.

As described above, the zoom system 500 of the present invention can be used in combination or can include any number of fixed focus lenses or additional electro-active lenses. Further, the zoom system 500 can be used in combination with a dynamic focusing system of the present invention (e.g., the dynamic focusing system 100 and/or 200), and can do so such that the dynamic focusing system maintains focus of the magnified or de-magnified image onto the focal plane as the object distance varies.

The zoom system 500, or a portion thereof, can also be used in conjunction with conventional zoom systems such as those described above. In such configurations—which may combine immobile lens elements and mobile lens elements—the movement of the mobile lens elements can provide a first level of adjustment (e.g., a coarse adjustment) and the immobile lens elements (e.g., the electro-active lenses and any immobile fixed focus lenses) can provide a second level of adjustment (e.g., a fine tuning adjustment). These systems of the present invention may be useful when changes in zoom levels are desired that are beyond a range that either the mechanical systems or the electro-active zoom systems can deliver independently, or when the speed of zoom change is required to be faster than the mechanical system can provide by itself.

Figure 6:
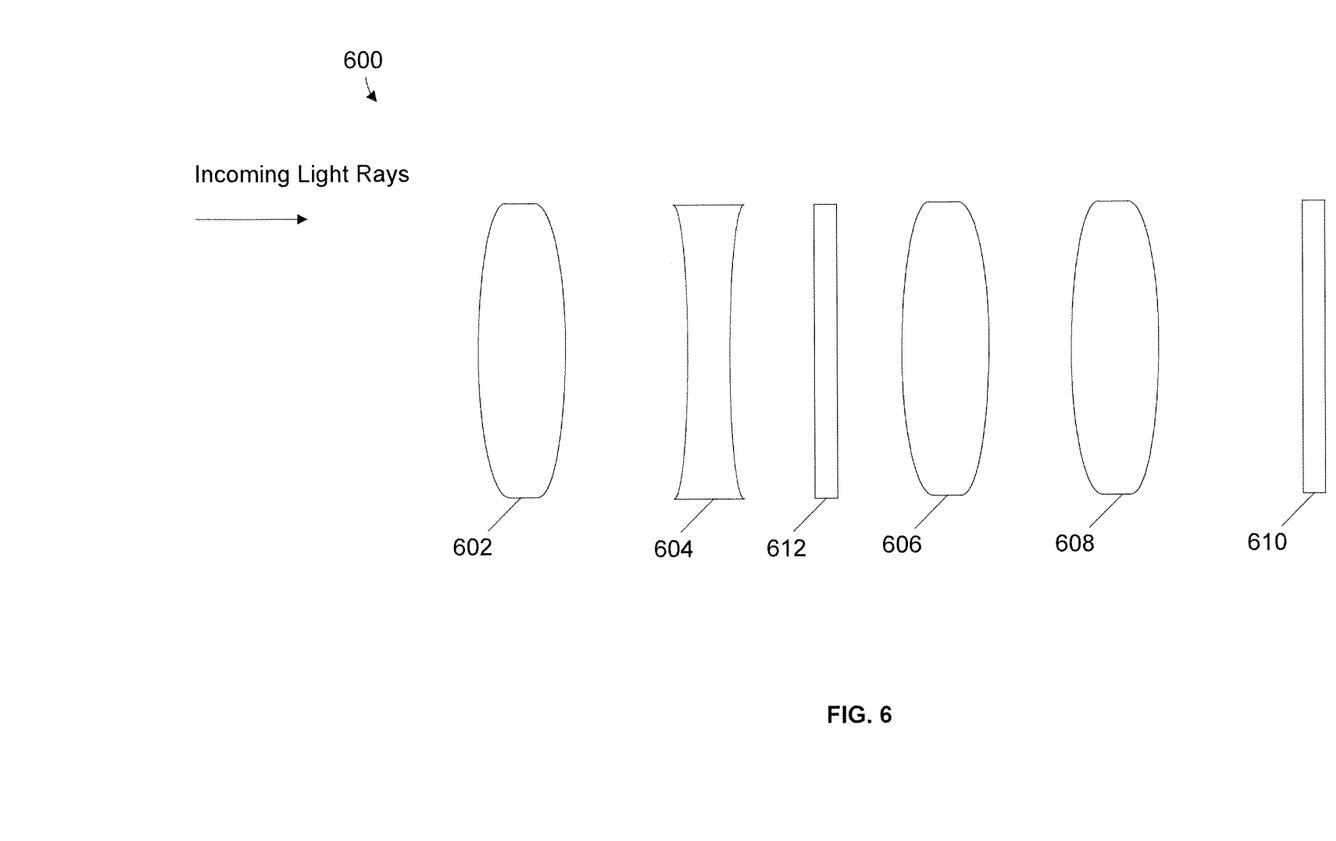
FIG. 6 illustrates a second zoom system in accordance with an aspect of the present invention.

FIG. 6 illustrates a zoom system 600 in accordance with an aspect of the present invention. As shown in FIG. 6, the zoom system 600 can comprise a first lens 602, a second lens 604, a third lens 606, a fourth lens 608 and a focal plane 610. The first lens 602 can be a converging lens. The second lens 604 can be a diverging lens. The third lens 606 can be a converging lens. The fourth lens 608 can be a converging lens and can function as a focusing element. The zoom system 600 can also include an electro-active lens 612. The electro-active lens can be any of the electro-active lenses described above (e.g., any of the variations in design or construction described above with respect to electro-active lens 102).

The zoom system 600 is not limited to the configuration depicted in FIG. 6. That is, the zoom system 600 is not limited to the particular arrangement and spacing of the shown constituent lens elements. Further, the electro-active lens 612 and the second lens 604 can be combined to form a composite lens or can be physically spaced apart from each other (e.g., as shown in FIG. 6). Additionally, the electro-active lens 612 can be positioned in front of the second lens 604. According to an aspect of the present invention, each of the constituent lens components of the zoom system 600 can be immobile. Under this scenario, even the second lens 604 can be immobile and the electro-active lens 612, by tuning between positive and negative optical powers, can be used to adjust the overall zoom capability of the zoom system 600.

According to an aspect of the present invention, each of the constituent lens components of the zoom system 600—other than the second lens 600—can be immobile. Under this scenario, mechanical movement of the second lens 604 can provide a coarse zoom adjustment and the tuning of the electro-active lens 612 can provide a fine zoom adjustment for the zoom system 600.

According to an aspect of the present invention, any of the lens groups depicted in FIG. 6 can be modified to include an electro-active lens to provide further optical power adjustments of any lens group or lens element.

The dynamic focusing systems of the present invention (e.g., the dynamic focusing system 100 and/or 200) and the zoom systems of the present invention (e.g., the zoom systems 500 and/or 600) can be operated or manipulated by a local or remote programmable controller. The controller can activate and deactivate and control the optical powers provided by the electro-active lenses and elements of the dynamic optical systems of the present invention. The controller can manipulate the dynamic optical systems of the present invention automatically or can be responsive to user or manual control or input.

The dynamic focusing systems of the present invention (e.g., the dynamic focusing system 100 and/or 200) and the zoom systems of the present invention (e.g., the zoom systems 500 and/or 600) provide numerous benefits over conventional focusing systems and conventional zoom systems. Specifically, as described above for certain aspects of the present invention, neither the dynamic focusing systems of the present invention nor the dynamic zoom systems of the present invention requires moving parts or components. Accordingly, these systems of the present invention can be made to be thinner and more lightweight than comparable conventional systems. Without the need to include a system for moving constituent components, the systems of the present invention can be constructed with fewer components resulting in comparable or lower cost to manufacture.

Further, the dynamic focusing systems of the present invention and the zoom systems of the present invention can be made using thin electro-active lenses. As a result, a speed of focus change can be improved compared to conventional systems. Additionally, the lack of moving parts allows the systems of present invention to be more tolerant to shock and vibration and makes these systems more impervious to particulate contamination. Accordingly, the systems of the present invention can reduce the likelihood of failure due to dust, dirt, and wear and tear.

Conclusion

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A system, comprising:
a first lens;
a second lens in optical communication with the first lens; and
a focal plane positioned to receive light focused by a combination of the first lens and the second lens;
wherein:
the first lens, the second lens, and the focal plane are immobile with respect to each other along an optical axis;
the first lens is physically spaced apart from the second lens by a first predetermined distance;
the first lens is physically spaced apart from the focal plane by a second predetermined distance;
the first lens is electro-active, and comprises at least two substrates;
a substantially transparent conductive electrode layer is operatively connected so each substrate;
at least one of the electrode layers is patterned and includes a plurality of ring electrodes;
at least one ring electrode of the plurality of ring electrodes is electrically connected to an adjacent ring electrode of the plurality of ring electrodes by a resistive bridge that electrically bridges a substantially annular insulating gap;
the at least one ring electrode is electrically connected to an input connection; and
the adjacent ring electrode is electrically connected to the input connection through the resistive bridge and the at least one ring electrode.

2. The system of claim 1, wherein:
the first lens has an adjustable optical power adapted to provide variable focusing capability.

3. The system of claim 1, wherein:
an adjustable optical power of the first lens is adapted to be varied within a predetermined range of optical powers.

4. The system of claim 1, wherein:
an adjustable optical power of the first lens is adapted to be continuously varied within a range of optical powers.

5. The system of claim 1, wherein:
an adjustable optical power of the first lens is adapted to be discretely varied within a range of optical powers.

6. The system of claim 1, wherein:
the first lens is adapted to be tuned between a positive optical power and a negative optical power.

7. The system of claim 1, wherein:
at least one of the substrates comprises an etched-pattern.

8. The system of claim 1, wherein:
at least one of the electrode layers is lithographically-patterned.

9. The system of claim 1, wherein:
tuning a voltage profile across the first lens provides multiple spherical lens powers.

10. The system of claim 1, further comprising:
a controller adapted for altering an adjustable optical power of the first lens.

11. The system of claim 1, wherein:
the second lens has a fixed power.

12. The system of claim 1, wherein:
the second lens is electro-active.

13. The system of claim 1, wherein:
the first lens has a first adjustable optical power adapted to provide a first variable focusing capability and the second lens is electro-active and has a second adjustable optical power adapted to provide a second variable focusing capability.

14. The system of claim 1, wherein:
the system is adapted to provide magnification or demagnification when the first lens is controlled to provide a negative optical power and the second lens is electro-active and is controlled to provide a positive optical power.

15. The system of claim 1, wherein:
the system is adapted to provide magnification or de-magnification when the first lens is controlled to provide a positive optical power and the second lens is electro-active and is controlled to provide a negative optical power.

16. The system of claim 1, further comprising:
a controller adapted for altering an adjustable optical power of the second lens, wherein the second lens is electro-active.

17. The system of claim 1, further comprising:
a third lens, wherein the third lens:
   has a fixed optical power;
   is physically spaced apart from the first lens by a third predetermined distance;
   is immobile with respect to the first lens and the second lens along the optical axis; and
   is in optical communication with the first lens, the second lens, and the focal plane.

18. The system of claim 1, further comprising:
a third lens, wherein the third lens:
   is electro-active;
   is physically spaced apart from the first lens by a third predetermined distance;
   is immobile with respect to the first lens and the second lens along the optical axis; and
   is in optical communication with the first lens, the second lens, and the focal plane.

19. The system of claim 1, wherein:
the focal plane comprises a charge-coupled device (CCD).

20. The system of claim 1, wherein:
the focal plane comprises a complementary metal oxide semiconductor (CMOS) device.

\* \* \* \* \*